Feb. 16, 1926.                                                                                      1,572,965
W. SCHAAKE
TROLLEY CONDUCTOR DEVICE
Filed Jan. 13, 1922
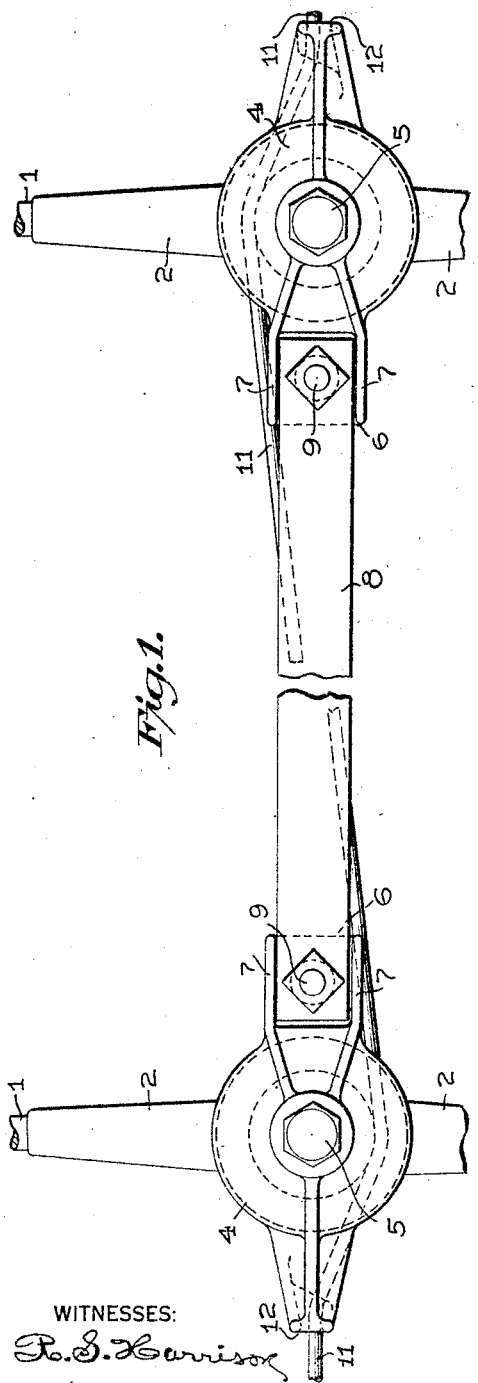
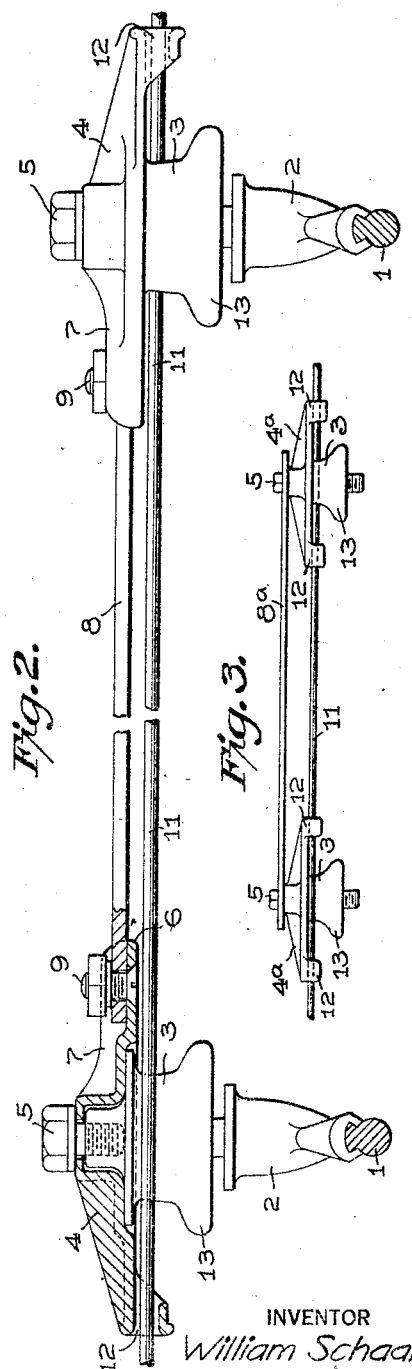
INVENTOR
William Schaake
BY
ATTORNEY
WITNESSES:

Patented Feb. 16, 1926.

1,572,965

UNITED STATES PATENT OFFICE.

WILLIAM SCHAAKE, OF PITTSBURGH, PENNSYLVANIA, ASSIGNOR TO WESTINGHOUSE ELECTRIC & MANUFACTURING COMPANY, A CORPORATION OF PENNSYLVANIA.

TROLLEY-CONDUCTOR DEVICE.

Application filed January 13, 1922. Serial No. 529,002.

*To all whom it may concern:*

Be it known that I, WILLIAM SCHAAKE, a citizen of the United States, and a resident of Pittsburgh, in the county of Allegheny and State of Pennsylvania, have invented a new and useful Improvement in Trolley-Conductor Devices, of which the following is a specification.

My invention relates to trolley-conductor devices and it has particular relation to suspension devices for supporting a plurality of conductors, such, for example, as would be employed for supplying current to a trackless-trolley vehicle.

One object of my invention is to provide an improved suspension device for supporting a plurality of trolley conductors that shall be simple and economical of construction and possess great strength and durability in operation.

Another object of my invention is to reduce the cost of manufacture of a suspension device for a plurality of trolley wires by employing a number of small suspension members that are fastened together by means of a single connecting member, instead of employing one large casting.

Still another object of my invention is to provide an insulating suspension member which may be so secured to a corresponding metallic suspension member that the insulating member may be brought tight against the shoulder of the metallic suspension device when the corresponding trolley ear is alined with a trolley wire that is supported thereby.

For a better understanding of my invention, reference may be made to the accompanying drawings, Figure 1 of which is a plan view of a suspension device constructed in accordance with my invention;

Fig. 2 is a view, in side elevation, of the suspension device that is illustrated in Fig. 1; and Fig. 3 is a modified form of the suspension device, also constructed in accordance with my invention.

Referring to Figs. 1 and 2, a plurality of parallel-extending trolley conductors 1 are respectively secured, by means of ears 2, to insulating suspension members 3 which are attached to corresponding metallic suspension members 4 by means of a plurality of tap bolts 5. Each of the suspension members 4 is provided with a lug 6 having a plurality of flange portions 7. Each end of a spacing member or connecting bar 8 is mounted in a groove or recess formed by the lug 6 and flanges 7 of the respective suspension members 4 and is attached to one of the lugs 6 by means of a bolt 9. The means employed to rigidly secure the insulating suspension member 3 to the corresponding metallic suspension member 4 also permits alining the ear 2 with a trolley conductor 1.

The connecting bar 8 may be of any suitable length, depending upon the distance that is desired between the trolley conductors 1. A cross-span cable 11 supports the suspension members 4, each of which is positioned thereon by means of a hooked lug 12. The cable 11, which is partially wound upon each of the insulating suspension members 3, is maintained thereon by means of a projection or flange 13 constituting a portion of the suspension insulator 3. By having the cable 11 partially twisted or zigzagged about the insulating suspension members 3, it is possible to employ like metallic suspension members 4 at the ends of the bar 8, thereby making it unnecessary to manufacture both right and left-hand insulating suspension members 3.

Referring to Fig. 3 of the drawings, corresponding parts of the trolley device have been given corresponding numerals. The lugs 6, having flanges 7, and the bolts 9, have been omitted from this modified form of suspension device, and a connecting bar 8ª is secured to the top of the suspension members 4ª by means of the same tap bolt 5 that secures the insulator member 3 to the suspension member 4.

Each of the suspension members 4 is provided with two hooked lugs 12 for mounting the suspension member 1 upon the cross-span cable 11.

From the above description, it is apparent that I have provided a very strong suspension device for a plurality of trolley conductors and that such structure effects a considerable saving over the cost of a single casting for effecting the same result. My suspension device also possesses the very great advantage of adjustability, for compensation for a change in distance between trolley conductors, all that is necessary being to vary the length between holes in the connecting bar, and for rigidly securing together the parts of the device although maintaining a trolley ear in alinement with the trolley conductor that is supported thereby.

While I have shown a trolley device constructed in accordance with a preferred form of my invention, it is apparent that minor modifications may be made in the arrangement of parts and their shape without departing from the spirit of my invention. I desire, therefore, to be limited only by the scope of the appended claims.

I claim as my invention:—

1. In a trolley-suspension device, the combination with a plurality of suspension members, each having a recessed portion, of means comprising a connecting bar positioned in said recesses for spacing said suspension members.

2. In a trolley-suspension device, the combination with a plurality of suspension members, each having a hook-shaped lug and a recessed portion, of means comprising a connecting bar positioned in said recesses for spacing said suspension members, a plurality of insulating members attached to said suspension members, and a cross-span wire positioned against opposite sides of alternate insulating members and partially surrounded by said lugs.

3. In a trolley-suspension device, the combination with a plurality of suspension members, of means for relatively positioning said members, and a supporting wire positioned against opposite sides of alternate members.

In testimony whereof, I have hereunto subscribed my name this 23rd day of December 1921.

WILLIAM SCHAAKE.